United States Patent
Xun et al.

(10) Patent No.: US 9,684,372 B2
(45) Date of Patent: Jun. 20, 2017

(54) SYSTEM AND METHOD FOR HUMAN COMPUTER INTERACTION

(71) Applicant: SAMSUNG ELECTRONICS CO., LTD., Suwon-si, Gyeonggi-do (KR)

(72) Inventors: Sun Xun, Beijing (CN); Chen Maolin, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 14/071,180

(22) Filed: Nov. 4, 2013

(65) Prior Publication Data

US 2014/0125584 A1   May 8, 2014

(30) Foreign Application Priority Data

Nov. 7, 2012  (CN) .......................... 2012 1 0440197
May 3, 2013  (KR) ........................ 10-2013-0050237

(51) Int. Cl.
  *G06F 3/041*   (2006.01)
  *G06F 3/01*   (2006.01)

(52) U.S. Cl.
  CPC .............. *G06F 3/013* (2013.01); *G06F 3/011* (2013.01); *G06F 3/012* (2013.01); *G06F 3/017* (2013.01)

(58) Field of Classification Search
  CPC ...... G06F 3/017; G06F 3/04815; G06F 3/013; G06F 3/005; G06F 3/0236; G06F 3/0304
  USPC ................................................ 345/156–184
  See application file for complete search history.

(56) References Cited

U.S. PATENT DOCUMENTS

| | | | |
|---|---|---|---|
| 5,689,619 A | 11/1997 | Smyth | |
| 7,460,690 B2 | 12/2008 | Cohen et al. | |
| 8,174,503 B2 | 5/2012 | Chin | |
| 2004/0150668 A1* | 8/2004 | Myers | G06F 3/0421 715/771 |
| 2011/0131502 A1* | 6/2011 | Ryu et al. | 715/744 |
| 2011/0154266 A1* | 6/2011 | Friend | A63F 13/06 715/863 |
| 2011/0193939 A1* | 8/2011 | Vassigh et al. | 348/46 |
| 2011/0255776 A1* | 10/2011 | Mark et al. | 382/154 |
| 2011/0317874 A1* | 12/2011 | Ikenoue | 382/103 |
| 2012/0030637 A1* | 2/2012 | Dey et al. | 715/863 |
| 2012/0050273 A1* | 3/2012 | Yoo et al. | 345/419 |
| 2012/0257035 A1* | 10/2012 | Larsen | 348/78 |
| 2013/0321265 A1* | 12/2013 | Bychkov et al. | 345/156 |

(Continued)

FOREIGN PATENT DOCUMENTS

| | | |
|---|---|---|
| JP | 08-234789 | 9/1996 |
| JP | 2000-163196 | 6/2000 |

(Continued)

OTHER PUBLICATIONS

Jamie Shotton et al., "Real-Time Human Pose Recognition in Parts from Single Depth Images", Microsoft Research Cambridge & Xbox Incubation, 8 pages total.

*Primary Examiner* — Nelson Rosario
(74) *Attorney, Agent, or Firm* — NSIP Law

(57) ABSTRACT

A system and method for human computer interaction (HCI), may acquire image data, determine an interaction intended to be conducted by a user based on various gestures and poses of the user detected from the image data, and perform an operation and/or function which is displayed on a display of a display unit, in response to a result of the interaction.

17 Claims, 7 Drawing Sheets

(56) References Cited

U.S. PATENT DOCUMENTS

| | | | | |
|---|---|---|---|---|
| 2013/0343607 A1* | 12/2013 | Wilf et al. | .................... | 382/103 |
| 2014/0028567 A1* | 1/2014 | Park et al. | .................... | 345/168 |
| 2014/0092014 A1* | 4/2014 | Srinivasan | .............. | G06F 3/013 |
| | | | | 345/158 |
| 2014/0204016 A1* | 7/2014 | Plowman | .............. | G06F 1/3231 |
| | | | | 345/156 |

FOREIGN PATENT DOCUMENTS

| | | |
|---|---|---|
| JP | 2002-269567 | 9/2002 |
| JP | 2005-322071 | 11/2005 |
| JP | 2007-094619 | 4/2007 |
| JP | 2009-037434 | 2/2009 |
| KR | 10-2007-0043469 | 4/2007 |
| KR | 10-2007-0060885 | 6/2007 |
| KR | 10-2011-0035162 | 4/2011 |
| KR | 10-2011-0040199 | 4/2011 |
| KR | 10-2011-0083770 | 7/2011 |

* cited by examiner

SYSTEM AND METHOD FOR HUMAN COMPUTER INTERACTION

CROSS-REFERENCE TO RELATED APPLICATIONS

This application claims priority to Chinese Patent Application No. 201210440197.1, filed on Nov. 7, 2012, in the State Intellectual Property Office and to Korean Patent Application No. 10-2013-0050237, filed on May 3, 2013, in the Korean Intellectual Property Office, the disclosures of each of which are incorporated herein by reference for all purposes.

BACKGROUND

1. Field

Embodiments disclosed herein relate to a system and method for human computer interaction (HCI).

2. Description of the Related Art

Computer vision technology-based human computer interaction (HCI) may obtain various images, and acquire a user input by processing the obtained images. The computer vision technology-based HCI is gaining a great deal of attention as a next generation HCI technology, and has a wide range of applications in not only the recreational but also entertainment industries. HCI technology may involve an interaction with a computer through a body pose, a head pose, a line of sight (LOS), or a motion of a user, and may allow the user to experience a new interaction beyond a traditional input method, such as, for example, a keyboard and a mouse.

One method for HCI may generate, modify, and manipulate a three-dimensional (3D) object through a touch input and a 3D gesture input. Another method for HCI may allow for an interaction with a virtual user interface by detecting a body pose.

SUMMARY

The foregoing and/or other aspects may be achieved by providing a system for human computer interaction (HCI) including an image acquisition unit to acquire image data, a line of sight (LOS) catch unit to detect a LOS of a user from the image data by detecting a pitch direction and a deflection direction of a head of the user from the image data, and an interaction determining unit to determine whether an interaction is initiated or terminated based on the LOS of the user detected by the LOS catch unit.

The HCI system may further include a pose tracking unit to track and recognize a pose and a gesture of a body of the user in the image data. The pose tracking unit may determine a motion and a gesture of a hand of the user by tracking and detecting a hand node of the user in the image data, and determine the pose and the gesture of the body of the user by detecting a skeleton node of the body of the user. The pose tracking unit may recognize the gesture of the user by tracking and recognizing a gesture of a finger of the user when the user is within a predetermined distance from the image acquisition unit, and by tracking and recognizing a gesture of an arm of the user when the user is located beyond the predetermined distance or farther from the image acquisition unit.

The interaction determining unit may further determine an interaction intended to be conducted by the user based on the pose and the gesture of the body of the user. The interaction determining unit may determine whether the an interaction is initiated based on the LOS of the user detected by the LOS catch unit and the gesture of the hand of the user detected by the pose tracking unit.

The HCI system may further include a display unit to display on a screen a result of the interaction, and the interaction determining unit may initiate a predetermined interaction with respect to a display item displayed on the screen when both the LOS of the user and a direction of the hand of the user face a direction of the display item for a period of time longer than a preset period of time. The interaction determining unit may stop the interaction with respect to the display item when neither the LOS of the user nor the direction of the hand of the user faces the direction of the display item.

The HCI system may further include a user-defined pose register unit to register an interaction instruction corresponding to a user-defined pose.

The foregoing and/or other aspects may be achieved by providing a method for HCI including acquiring image data, detecting a gesture of a user by tracking and recognizing a gesture of a first body part (e.g., a finger) of the user when the user is within a predetermined distance from an image acquisition unit to acquire the image data, and detecting the gesture of the user by tracking and recognizing a gesture of a second body part (e.g., an arm) of the user when the user is located beyond the predetermined distance or farther from the image acquisition unit. The second body part may be larger than the first body part. At least one of a start and an end of an interaction may be determined based on the detected gesture of the user. A predetermined interaction may be initiated with respect to a display item displayed on a screen when both an LOS of the user and a direction of a hand of the user face a direction of the display item for a period of time longer than a preset period of time. When neither the LOS of the user nor the direction of the hand of the user faces the direction of the display item, the interaction may be stopped with respect to the display item.

The HCI method may further include detecting the LOS of the user from the image data by detecting a pitch direction and a deflection direction of a head of the user from the image data, and determining at least one of a start and an end of an interaction based on the detected LOS of the user and the detected gesture of the user. When an interaction instruction corresponding to a user-defined pose is registered, information associated with reproducibility and ambiguity of the user-defined pose may be provided to the user.

The foregoing and/or other aspects may be achieved by providing a system for HCI including an image acquisition unit to acquire image data, an HCI processing unit to determine an interaction intended to be conducted by a user based on various gestures and poses of the user detected from the image data, and a display unit to perform a display on a screen in response to a result of the interaction.

The HCI processing unit may include a gesture detecting unit to detect various gestures and poses of the user from the image data, an interaction determining unit to determine an interaction intended to be conducted by the user based on the various gestures and poses of the user detected by the gesture detecting unit, and a display control unit to control the display unit to display the interaction on the screen based on the interaction determined by the interaction determining unit.

The gesture detecting unit may include a LOS catch unit to detect an LOS of the user from the image data, and a pose tracking unit to track and recognize a pose and a gesture of each body part of the user in the image data. The LOS catch unit may detect a LOS of the user by detecting a pitch direction and a deflection direction of a head of the user from the image data. The pose tracking unit may determine a motion and a gesture of a hand of the user by tracking and detecting a hand node of the user in the image data, and determine a pose and a gesture of each body part of the user by detecting a skeleton node of a body of the user.

The interaction determining unit may determine whether an interaction is initiated based on the LOS of the user detected by the LOS catch unit and the gesture of the hand of the user recognized by the pose tracking unit. When both the LOS of the user and a direction of the hand of the user face a direction of the display item for a period of time longer than a preset period of time, the interaction determining unit may initiate an interaction with respect to a display item displayed on a screen. When neither the LOS of the user nor the direction of the hand of the user faces the direction of the display item, the interaction determining unit may stop the interaction with respect to the display item.

The pose tracking unit may recognize the gesture of the user by tracking and recognizing a gesture of a finger of the user when the user is close to the image acquisition unit, and by tracking and recognizing a gesture of an arm of the user when the user is far away from the image acquisition unit.

The HCI processing unit may further include a user-defined pose register unit to register an interaction instruction corresponding to a user-defined pose.

The foregoing and/or other aspects may be achieved by providing a method for HCI including acquiring image data, determining an interaction intended to be conducted by a user based on various gestures and poses of the user detected from the image data, and performing a display on a screen in response to a result of the interaction.

The determining of the interaction may include detecting various gestures and poses of the user from the image data, determining an interaction intended to be conducted by the user based on the various gestures and poses of the user detected by a gesture detecting unit, transmitting a display instruction corresponding to the interaction, and controlling a display unit to display the interaction on the screen based on the determined instruction.

The detecting of the various gestures and poses of the user may include detecting an LOS of the user from the image data and tracking and recognizing a pose and a gesture of each body part of the user.

The LOS of the user may be determined by detecting a pitch direction and a deflection direction of a head of the user from the image data.

A motion and a gesture of a hand of the user may be determined by tracking and detecting a hand node of the user in the image data, and a pose and a gesture of each body part of the user may be determined by detecting a skeleton node of a body of the user. Also, whether an interaction is initiated may be determined based on the detected LOS of the user and the gesture of the hand of the user recognized by a pose tracking unit.

A plurality of display items may be displayed by a display. An interaction with respect to the plurality of display items may be initiated when both a direction indicated by a hand and a LOS of the user are determined to face a direction of the plurality of display items, a first item among the plurality of display items may be selected when a gesture of a first finger is detected as indicating the first item, and a sub-menu corresponding to the first item may be displayed when a gesture of a second finger is detected as indicating the first item.

A three-dimensional (3D) item may be displayed by a display. An interaction with respect to the 3D item with respect to the 3D item may be initiated when both a direction indicated by one of the first or second body part and a LOS of the user are determined to face a direction of the 3D item. At least one of moving the 3D item, expanding a size of the 3D item, or reducing a size of the 3D item may be performed, based on the detected gesture of one of the first or second body part.

A preset area of a screen of a display may be displayed as a hand writing area. An interaction with respect to the preset area may be initiated when both a direction indicated by one of a first or second body part and a LOS of the user are determined to face a direction of the preset area. A text input by the user may be determined based on the detected gesture of one of the first or second body part and an interaction corresponding to the determined text may be conducted.

The foregoing and/or other aspects may be achieved by providing a method for human computer interaction (HCI), the method including acquiring, using a camera, image data of a user positioned away from a display, determining a line of sight and a pose of a user based on the image data, calculating an intersection point at which a direction indicated by at least one body part of the user and a screen of the display intersect, detecting a gesture of the user by tracking and recognizing a gesture of the at least one body part of the user, and determining an interaction intended to be performed by the user based on the calculated intersection point, detected gesture, and the direction indicated by the at least one body part.

The foregoing and/or other aspects may be achieved by providing a non-transitory computer readable recording medium to store executable computer instructions, that when executed, cause a computer to implement any of the operations performed in the methods according to the example embodiments disclosed herein.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
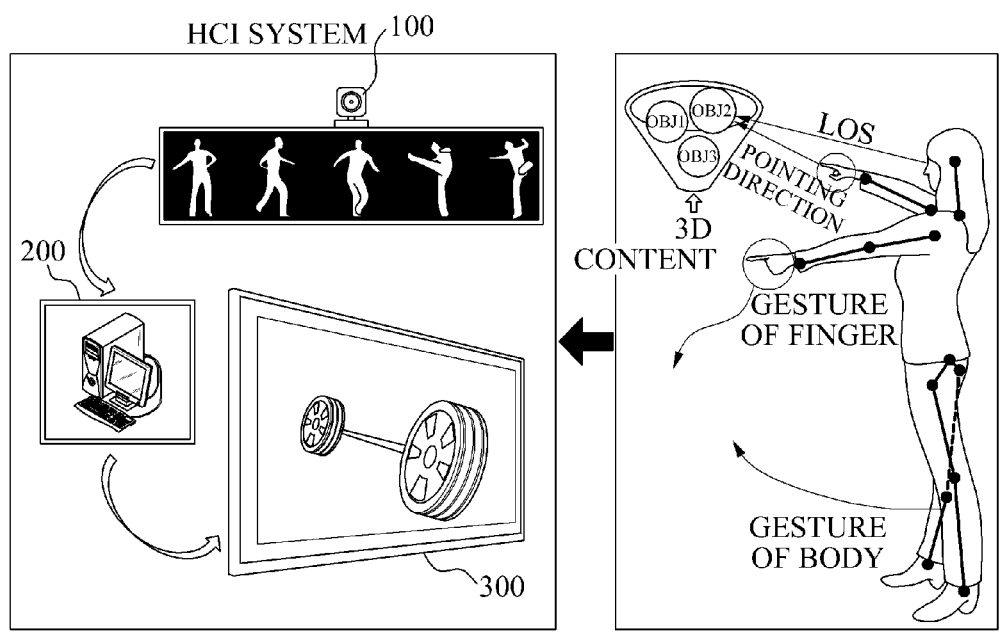
FIG. 1 is a conceptual diagram illustrating a system for human computer interaction (HCI) and an interaction being conducted by a user according to an exemplary embodiment.

Hereinafter, exemplary embodiments are described in detail by referring to the accompanying drawings. Reference will be made in detail to example embodiments, examples of which are illustrated in the accompanying drawings, wherein like reference numerals refer to like elements throughout.

FIG. 1 is a conceptual diagram illustrating a system for human computer interaction (HCI) and an interaction being conducted by a user according to an exemplary embodiment. As shown in FIG. 1, the system for HCI according to an exemplary embodiment may include an image acquisition unit 100, a HCI processing unit 200, and a display unit 300.

The image acquisition unit (image acquirer) 100 may refer to a device which acquires image data (e.g., a camera). The image data may include depth characteristics and color characteristics. The image acquisition unit 100 may correspond to or be embodied by a device for photographing a depth image, for example, a depth camera.

The HCI processing unit (HCI processor) 200 may recognize a pose and a gesture of a user by analyzing the image data acquired by the image acquisition unit 100. Also, the HCI processing unit 200 may analyze the pose and the gesture of the user. Also, the HCI processing unit 200 may control the display unit 300 to perform a corresponding display based on results of the analysis. The display unit 300 may include a TV, a projector, a liquid crystal display (LCD) monitor, and the like. The display unit 120 may also be embodied by, for example, a light emitting diode (LED) display, organic light emitting diode (OLED) display, plasma display panel (PDP), cathode ray tube (CRT), and the like.

Here, as shown in FIG. 1, the HCI processing unit 200 may determine an interaction intended to be conducted by the user based on various gestures and poses being detected. For example, among a plurality of objects, for example, OBJ1, OBJ2, and OBJ3, of content displayed on the display unit 300, the user may conduct an interaction by indicating a particular object, for example, OBJ2, with a finger of the user while viewing the particular object. The HCI processing unit 200 may detect a line of sight (LOS) of the user, a gesture of the user, and a gesture and a pose of each body part of the user. Through the HCI processing unit 200, the user may manipulate the particular object indicated by the finger of the user. For example, the HCI processing unit 200 may change a location of the object displayed on the display unit 300. Also, the user may conduct an interaction by moving an entire body or a body part, for example, by moving an arm. For example, the user may point to a particular desired object displayed on the display (e.g., OBJ1). The HCI processing unit 200 may detect a line of sight (LOS) of the user, a gesture of the user, and a gesture and a pose of each body part of the user to recognize or determine that the user desires to perform some operation with respect to OBJ1. For example, the user may desire to select OBJ1, open an application associated with OBJ1 (e.g., by "double-clicking" on OBJ1), move OBJ1 to another portion of the display (e.g., a drag operation on OBJ1), and/or perform other functions. Here, it is noted that the user may be physically separated from the display such that the user does not physically touch the monitor or screen of the display.

Although the image acquisition unit 100, the HCI processing unit 200, and the display unit 300 are illustrated as separate devices in FIG. 1, the image acquisition unit 100, the HCI processing unit 200, and the display unit 300 may be combined into one or more configurations. For example, the image acquisition unit 100 and the HCI processing unit 200 may be implemented as one configuration. That is, the image acquisition unit 100, the HCI processing unit 200, and the display unit 300 may be integrally combined into a single physical device. Also, one configuration among the image acquisition unit 100, the HCI processing unit 200, and the display unit 300, for example, the HCI processing unit 200, may be embodied as a plurality of physical or logical configurations. That is, the image acquisition unit 100, the HCI processing unit 200, and the display unit 300 may be separately distributed among two or more physical devices.

Hereinafter, a structure of the HCI processing unit 200 included in the HCI system according to an exemplary embodiment is described in detail with reference to FIG. 2.

Figure 2:
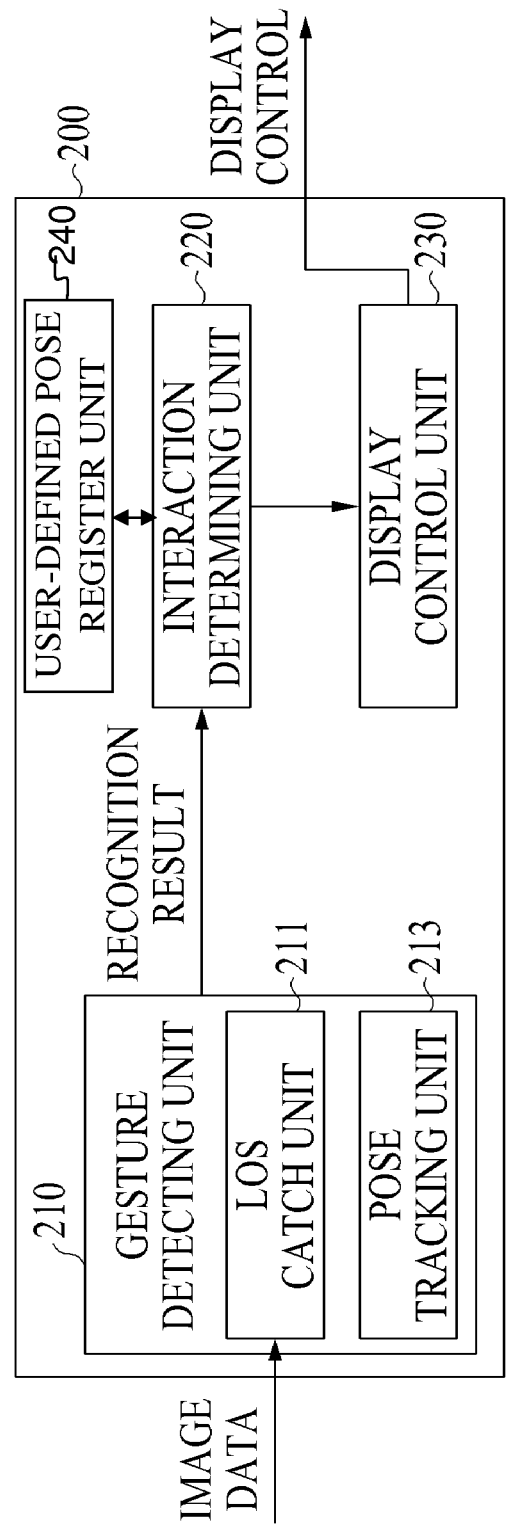
FIG. 2 is a block diagram illustrating a structure of an HCI processing unit included in a system for HCI according to an exemplary embodiment.

FIG. 2 is a block diagram illustrating the structure of the HCI processing unit 200 included in the system for HCI according to an exemplary embodiment.

As shown in FIG. 2, the HCI processing unit 200 according to an exemplary embodiment may include a gesture detecting unit (gesture detector) 210, an interaction determining unit (interaction determiner) 220, and a display control unit (display controller) 230. The gesture detecting unit 210 may determine a pose of a user by detecting various gestures of the user. For example, the gesture detecting unit 210 may detect and determine a LOS of the user and a gesture and a pose of a body part of the user. The interaction determining unit 220 may determine an interaction to be conducted based on the various gestures and/or poses of the user detected by the gesture detecting unit 210.

Hereinafter, an operational process of the gesture detecting unit 210 is described in detail.

According to an exemplary embodiment, the gesture detecting unit 210 may include a LOS catch unit (a LOS catcher) 211 and a pose tracking unit (pose tracker) 213.

The LOS catch unit 211 may detect a LOS of a user from the image data. For example, the LOS catch unit 211 may obtain a LOS of a user by detecting a pose of a head of the user from the image data. The pose of the head may be represented by a pitch and a deflection of the head. Accordingly, the LOS catch unit 211 may obtain the LOS of the user by estimating a pitch angle and a deflection angle of the head in a head region included in a depth image, and by combining corresponding poses of the head based on the estimated pitch angle and the estimated deflection angle.

The pose tracking unit 213 may track and recognize a pose of each body part of the user. For example, the pose tracking unit 213 may track and recognize a direction indicated by the user from the acquired image data. Also, the pose tracking unit 213 may track and recognize a gesture of a finger of the user. In this example, through a gesture of the hand, the pose tracking unit 213 may track a path along which a hand moves, and a speed at which the hand moves. Also, the pose tracking unit 213 may track and recognize a gesture for each body part of the user, for example, an arm. Alternatively, or in addition, the pose tracking unit 213 may track other body parts (e.g., a foot, leg, waist, and the like).

According to an exemplary embodiment, when the user is within a predetermined distance from the image acquisition unit 100, for example, the user is close to the image acquisition unit 100, the pose tracking unit 213 may determine a direction indicated with a finger of the user and a gesture of the finger by tracking a hand node of the user through accurate and reliable image data.

When the user is located beyond the predetermined distance or farther from the image acquisition unit 100, for example, the user is far away from the image acquisition unit 100, the acquired image data may be inaccurate and contain a large amount of noise, and thus, have a reduced hand region. In this case, the pose tracking unit 213 may track and recognize a direction indicated with an arm of the user and a gesture of the arm by tracking the arm of the user, for example, a skeleton between a wrist node and an elbow node, through tracking of a skeleton node of a body. The predetermined distance value may be defined or set by the user, or defined or set as a default value.

According to an exemplary embodiment, the pose tracking unit 213 may recognize the gesture of the hand of the user based on a skin tone and/or 3D characteristics. More particularly, the pose tracking unit 213 may include a sorter for training based on the skin tone and/or the 3D characteristics. A determination may be made as to whether a possible pixel corresponds to a pixel of the hand with a skin tone sorter (skin color determining unit) based on a color distribution of the hand through use of a probability model, for example, a Gaussian mixture model (GMM).

With respect to depth characteristics, as per an approach introduced in *Real-Time Human Pose Recognition in Parts from Single Depth Images*, to Jamie Shotton et al., in *CVPR* 2011, a degree of similarity may be measured by generating a depth comparison feature or by comparing a certain depth block shaped in a form of a small square to a block of a hand model.

Subsequently, to position the hand in two-dimensional (2D) and 3D spaces, the pose tracking unit 213 may detect the hand on a frame-by-frame basis, and track and calculate a path along which the hand moves and a speed at which the hand moves. When the hand is far away from the image acquisition unit 100 and a size of a hand region in the image data is found to be less than a preset threshold value, the pose tracking unit 213 may determine a gesture of an arm using a method of tracking a body skeleton of the user in consideration of data reliability. The preset threshold size value may be defined or set by the user, or defined or set as a default value.

The interaction determining unit 220 may determine an interaction intended to be conducted by the user based on the various gestures of the user detected by the gesture detecting unit 210. For example, the interaction determining unit 220 may determine whether an interaction is initiated based on the LOS of the user detected by the LOS catch unit 211. Alternatively, the interaction determining unit 220 may determine whether an interaction is initiated based on the direction indicated by the user recognized by the pose tracking unit 213. Alternatively, the interaction determining unit 220 may determine whether an interaction is initiated using both the LOS of the user detected by the LOS catch unit 211 and the direction indicated by the user recognized by the pose tracking unit 213.

In another exemplary embodiment, the interaction determining unit 220 may determine whether the interaction is stopped based on the LOS of the user detected by the LOS catch unit 211. Alternatively, the interaction determining unit 220 may determine whether the interaction is stopped based on the direction indicated by the user recognized by the pose tracking unit 213. As another alternative, the interaction determining unit 220 may determine whether the interaction is stopped using both the LOS of the user detected by the LOS catch unit 211 and the direction indicated by the user recognized by the pose tracking unit 213.

More particularly, the interaction determining unit 220 may determine whether the interaction is initiated or stopped based on one or both of the LOS of the user and the direction indicated by the user. For example, both the LOS of the user detected by the LOS catch unit 211 and the direction indicated by the user recognized by the pose tracking unit 213 may face a direction of a certain display item displayed on the display unit 300 for a period of time longer than a preset period of time. The interaction determining unit 220 may then determine an interaction intended to be conducted by the user and manipulate a display item being displayed after this period of time has passed. As an example, if both the LOS of the user detected by the LOS catch unit 211 and the direction indicated by the user recognized by the pose tracking unit 213 face a direction of a particular display item located at a point of intersection between the LOS and the indicating direction, for a period of time longer than a preset period of time, the interaction determining unit 220 may determine an interaction intended to be conducted by the user and manipulate a display item being displayed. During manipulating of the display item, the interaction determining unit 220 may determine whether at least one direction of the LOS of the user and the direction indicated by the user maintain the direction facing the display item. When the LOS of the user and the direction indicated by the user are inconsistent with the direction facing the display item, the interaction determining unit 220 may determine that the user stops the interaction with respect to the display item. Accordingly, through this method, whether the user initiates or stops an interaction may be determined more precisely, resulting in improved accuracy of the interaction.

Although this exemplary embodiment shows that the start and/or end of the interaction is determined based on the detected gesture and pose of the user as described in the foregoing, exemplary embodiments are not limited thereby.

The start and/or end of the interaction may be determined by other preset methods. For example, the interaction may be initiated based on an LOS and/or a preset gesture of the user.

Figure 3:
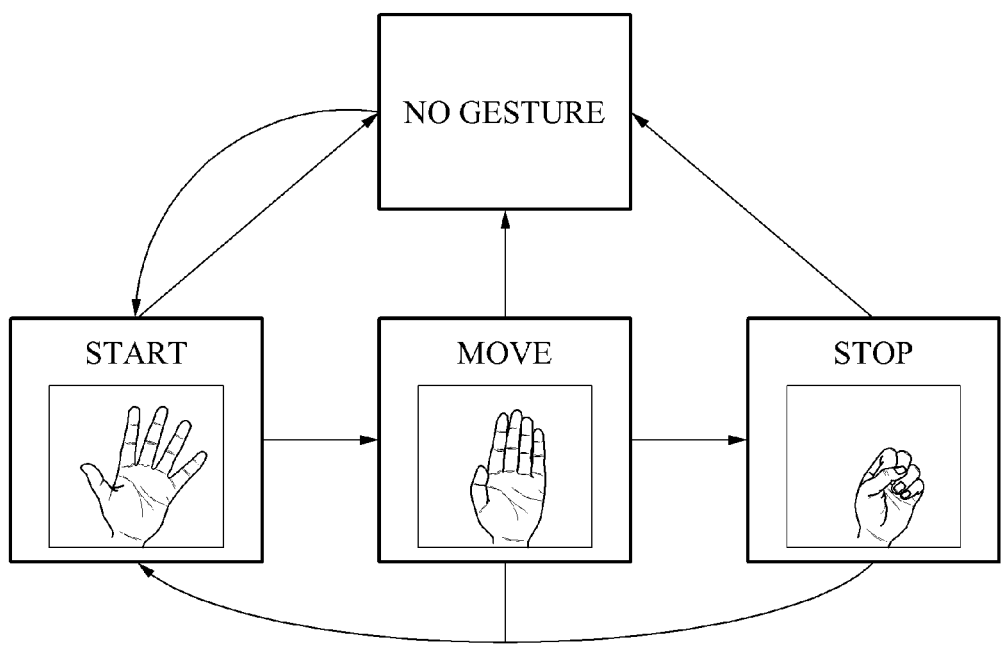
FIG. 3 is a conceptual diagram illustrating a gesture for starting or stopping an HCI according to an exemplary embodiment.

Referring to FIG. 3, when the gesture detecting unit 210 of FIG. 2 detects, from the image data, that fingers of the user are open (spread apart) and an LOS of the user faces a direction of a particular item displayed on a screen of the display unit 300, the interaction determining unit 220 may determine that the user intends to initiate an interaction with respect to the particular item.

When the gesture detecting unit 210 detects that the user moves a hand with fingers put together, the interaction determining unit 220 may determine that the user intends to move the particular item.

Finally, when the gesture detecting unit 210 detects that the user clenches a fist, the interaction determining unit 220 may determine that the user intends to stop an interaction. However, the above examples are merely examples, and the start, move, and stop gestures may be differently arranged, or other hand gestures may be used to perform the start, move, and stop operations. Further, the hand gestures may be preset by the user or set as default hand gestures, and may be changeable or customized by a user.

When an interaction is initiated, the interaction determining unit 220 may determine an interaction intended to be conducted by the user based on one or both of a gesture and a pose of the user. According to an exemplary embodiment, the interaction determining unit 220 may determine an interaction with respect to a move pointer based on a direction indicated by a hand of the user. Based on the direction (e.g., left, right, up, down, diagonal, or a specific direction, for example in terms of degrees or coordinate values, and the like), indicated by the hand of the user detected by the pose tracking unit 213, the interaction determining unit 220 may calculate a point at which the direction indicated by the hand and the screen intersect, and obtain a position of the pointer on the screen, relative to the calculated intersection. When the hand of the user moves, the interaction determining unit 220 may transmit a corresponding interaction instruction to the display control unit 230. The display control unit 230 may control the display unit 300 to move the pointer on the screen with the movement of the hand. For example, the pointer on the screen may move in proportion to movement of the hand, or may move at a slower or faster rate of movement of the hand. The movement of the pointer may be defined as movement relative to the user. That is, from the viewpoint of the user, the pointer may be moved left as the user moves his or her hand to the left, although from the display's perspective the movement of the pointer would be to the right. For an upward or downward movement of the user's hand, from the viewpoint of the user, the pointer may be moved up or down, which would be the same movement from the display's perspective. However, the disclosure is not limited to the above-described embodiments. For example, according to user or default settings, the movement of the pointer need not be in the same direction from the user's perspective as the movement of the hand of the user, but may be in a different direction, for example an opposite direction.

According to an exemplary embodiment, the interaction determining unit 220 may determine an interaction with respect to a button based on the gesture of the hand of the user detected by the pose tracking unit 213. Alternatively, the interaction determining unit 220 may calculate a point at which the direction indicated by the hand and the screen intersect based on the direction indicated by the hand of the user detected by the pose tracking unit 213. When a display item such as a button is present at the calculated intersection, the interaction determining unit 220 may determine that the user intends to touch the display item, for example, the button. Alternatively, when the pose tracking unit 213 detects that a finger or a fist of the user rapidly moves to a direction indicated by the finger or the fist, the interaction determining unit 220 may determine that the corresponding display item, for example, the button, is touched. The degree or relative speed/rapidity of movement, e.g., of the user's finger or fist, may be determined in relationship to a preset (user defined or default value) rate of movement.

Although this exemplary embodiment shows that the interaction determining unit 220 determines an interaction intended to be conducted by the user based on the LOS of the user detected by the LOS catch unit 211, and one or both of the pose and the gesture of the user is recognized by the pose tracking unit 213, an interaction according to exemplary embodiments is not limited to this exemplary embodiment. Other interactions may be conducted based on one or both of a gesture of a user and an LOS of the user. For example, a display item may be moved or rotated by a movement of a hand. Alternatively, a display item may be touched or double-touched by a gesture of a finger.

Also, according to an exemplary embodiment, the user may user-define an interaction corresponding to a predetermined gesture and/or pose. For this purpose, the HCI processing unit 200 may further include a user-defined pose register unit (user-defined pose register) 240 to register an interaction corresponding to a user-defined pose. The user-defined pose register unit may include a database to enable a registered pose and/or gesture to be mapped to a corresponding interaction instruction. For example, when a 2D or 3D display item is displayed, the 2D or 3D display item may be reduced or expanded by tracking a direction of two hands.

By way of example, the database of the user-defined pose register unit may be embodied as a storage medium, such as a nonvolatile memory device, such as a Read Only Memory (ROM), Programmable Read Only Memory (PROM), Erasable Programmable Read Only Memory (EPROM), and flash memory, a volatile memory device such as a Random Access Memory (RAM), a hard disc, and an optical disc, or combinations thereof. However, examples of the database are not limited to the above description, and the database may be realized by other various devices and structures as would be understood by those skilled in the art.

To register a new pose and/or gesture, the user-defined pose register unit 240 may measure reproducibility and ambiguity of a user-defined pose, and return information associated with reproducibility and/or ambiguity of the user-defined pose to the user. The user-defined pose register unit 240 may calculate reproducibility, ambiguity, and complexity of a user-defined pose and/or gesture. The user-defined pose register unit 240 may compare the calculated value to a threshold value, and register the user-defined pose and/or gesture when the calculated value is greater than the threshold value. Conversely, the user-defined pose register unit 240 may request the user to register a pose and/or gesture having high reproducibility and low ambiguity when the calculated value is less than the threshold value. The information associated with reproducibility and ambiguity may be represented as a numerical reliability score or correspond to character information, for example, "ambiguous gesture". The interaction determining unit 220 may determine an interaction corresponding to a user-defined pose with reference to the user-defined pose register unit 240.

When the interaction determining unit 220 determines an interaction intended to be conducted by the user, the interaction determining unit 220 may transmit a corresponding interaction instruction to the display control unit 230. The display control unit 230 may control the display unit 300 to display the corresponding interaction on the screen based on the interaction instruction. For example, the display control unit 230 may control the display unit 300 to display a screen on which a pointer is moved, a screen on which a display item is moved, and/or a screen on which a button is touched, and the like.

Hereinafter, a method for HCI according to an exemplary embodiment is described in detail with reference to FIG. 4.

Figure 4:
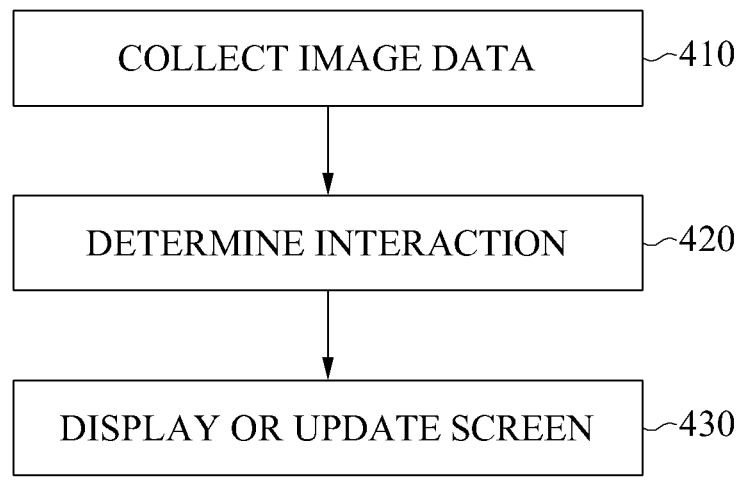
FIG. 4 is a flowchart illustrating a method for HCI according to an exemplary embodiment.

As shown in FIG. 4, in operation 410, the image acquisition unit 100 may acquire image data.

In operation 420, the HCI processing unit 200 may analyze various poses and gestures of a user from the image data acquired by the image acquisition unit 100. Also, the HCI processing unit 200 may determine whether an interaction is initiated and an interaction intended to be conducted by the user. For example, the HCI processing unit 200 may determine an interaction intended to be conducted by the user by detecting and recognizing a LOS of the user, and a gesture and a pose of one or more body parts (e.g., one, plural, or all body parts) of the user from the image data. According to an exemplary embodiment, the HCI processing unit 200 may determine whether an interaction is initiated based on the detected LOS and a direction indicated by the user. For example, when both the LOS of the user and a direction of a hand of the user detected in the image data by the HCI processing unit 200 face a direction of a display item displayed on a screen of the display unit 300 for a period of time longer than a preset period of time, the HCI processing unit 200 may initiate an interaction and determine an interaction with respect to a display item based on a gesture and a pose maintained by the user. The preset period of time may be set as a default value or may be set or changed by a user.

In operation 430, the display unit 300 may be controlled to display or update a corresponding screen in response to the determined interaction. For example, the HCI processing unit 200 may determine a location to which the user intends to move a pointer based on the direction indicated by the hand of the user. In response to the determined interaction, the display unit 300 may display that the pointer is moved to the location to which the user intends to move on the screen. Also, the HCI processing unit 200 may determine to move a display item based on the direction indicated by the hand of the user. In response to the determined interaction, the display unit 300 may display that the display item is moved on the screen. Also, the HCI processing unit 200 may determine to touch a display item based on the gesture of the hand of the user. In response to the determined interaction, the display unit 300 may display that the display item is touched on the screen. Also, the HCI processing unit 200 may determine to double-touch a display item based on the gesture of the hand of the user. In response to the determined interaction, the display unit 300 may display that the display item is double-touched on the screen. For example, the touch or double-touch may serve or act to perform some function relative to or associated with the display item (e.g., a button). For example, the touch or double-touch may be used to open and/or execute a program or application associated with the display item, open and/or display a folder associated with the display item, select the display item, access a menu associated with the display item, highlight the display item, and the like. The HCI processing unit 200 may distinguish between different types of touches which may correspond to or be similar to a left-click and right-click operation of a mouse, thereby performing different operations or functions depending on whether the HCI processing unit 200 determines the touch to be associated with the left-click or right-click operation, based on the finger or hand or arm which is used to perform the gesture and/or pose, for example.

During conducting the interaction in operation 420, the HCI processing unit 200 may determine that the user intends to stop the interaction with respect to the display item when the direction indicated by the user and the LOS of the user are detected to be out of the display item. Through a different gesture and/or pose of the user, the HCI processing unit 200 may determine that the user intends to stop the interaction. For example, the interaction may be stopped by a specific gesture, for example, a fist clenching gesture, of the user.

Hereinafter, a method of conducting various interactions using the method for HCI according to an exemplary embodiment is described with reference to FIGS. 5 through 7.

Figure 5:
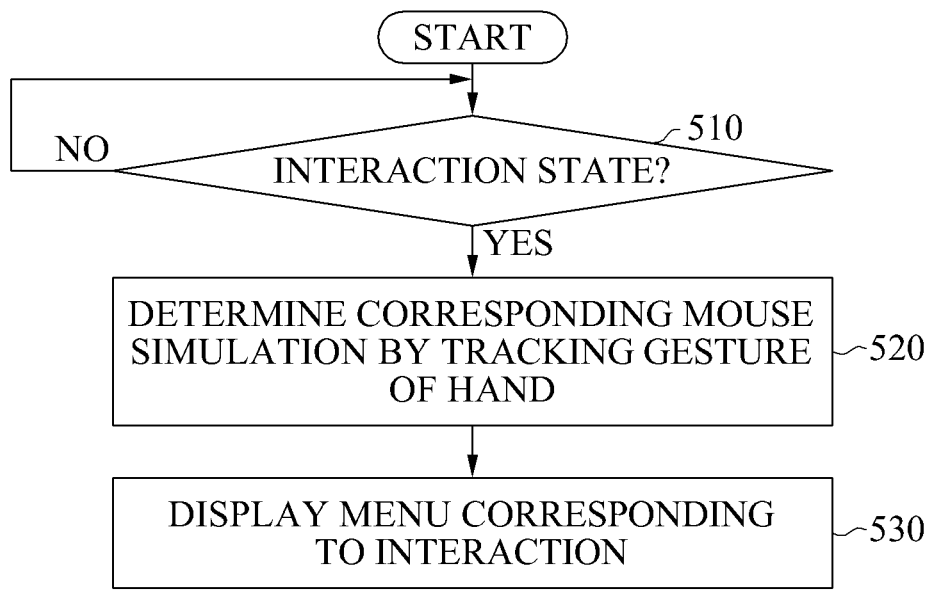
FIG. 5 is a flowchart illustrating a method of performing a menu manipulation using a method for HCI according to an exemplary embodiment.

FIG. 5 is a flowchart illustrating a method of manipulating a menu using the method for HCI according to an exemplary embodiment.

In the exemplary embodiment of FIG. 5, a preset menu may be displayed on the display unit 300, and include a plurality of items for a user to conduct an interaction.

In operation 510, when both a direction indicated by a hand and an LOS of the user are determined to face a direction of a particular menu on a screen based on a pose of a body detected from image data, the HCI processing unit 200 may initiate an interaction with respect to the menu.

In operation 520, a gesture of the hand of the user may be determined by tracking a path and a speed of the gesture of the hand, and an interaction intended to be conducted by the user may be determined based on the gesture of the hand. For example, an interaction w similar to an operation performed by a mouse may be simulated or performed based on the gesture of the hand of the user. When the user clicks with an index finger, the user may select a particular item of the menu indicated by the finger. When the user clicks with a middle finger, a content corresponding to a right button of the mouse may be displayed. For example, an additional menu corresponding to the item may be displayed.

In operation 530, the display unit 300 may be controlled to display or update a menu corresponding to the determined interaction.

Figure 6:
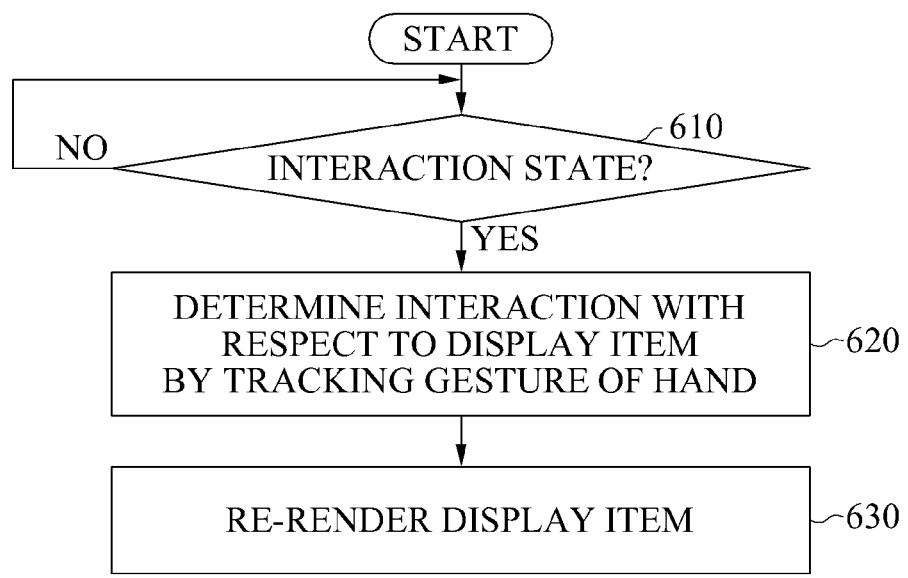
FIG. 6 is a flowchart illustrating a method of conducting an interaction with respect to a three-dimensional (3D) display item using a method for HCI according to an exemplary embodiment.

FIG. 6 is a flowchart illustrating a method of conducting an interaction with respect to a 3D display item using the method for HCI according to an exemplary embodiment. Here, the display unit 300 may include a display unit to display 3D contents.

In operation 610, when both a direction indicated by a hand of a user and an LOS of the user are determined to face a direction of a particular 3D display item on a screen based on a pose of a body detected from image data, an interaction with respect to the 3D display item may be initiated.

In operation 620, a gesture of the hand of the user may be determined by tracking a path and a speed of the gesture of the hand of the user. An interaction intended to be conducted by the user may be determined based on the gesture of the hand. For example, a 3D display item located at a point at which the direction indicated by the hand and the LOS of the user intersect may be picked up, and the 3D display item may be moved with a movement of the hand. Also, the selected 3D display item may be moved, expanded, or reduced based on the gesture of the hand. That is, a zoom operation (zoom-in, zoom-out, etc.) may be performed based on the gesture of the hand.

In operation 630, the display unit 300 may be controlled to re-render the 3D display item after the interaction, based on the determined interaction.

Figure 7:
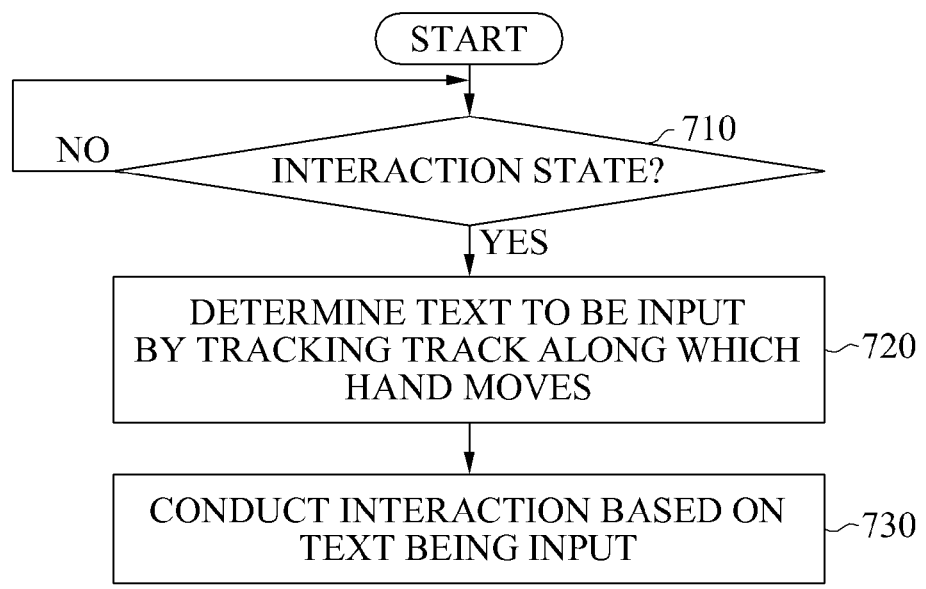
FIG. 7 is a flowchart illustrating a method of performing hand writing using a method for HCI according to an exemplary embodiment.

FIG. 7 is a flowchart illustrating a method of performing hand writing using the method for HCI according to an exemplary embodiment. For example, a preset area may be set to correspond to a hand writing area on a screen displayed on the display unit 300. The preset area may correspond to a portion or all of the screen of the display unit 300. The preset area may be set as a default or set by a user based on a user input to change or customize a size or location of the preset area. For example, the preset area may be in one location or multiple locations of the screen displayed on the display unit 300.

In operation 710, when both a direction indicated by a hand of a user and an LOS of the user are determined to face a direction of a hand-writing area set on a screen based on a pose of a body detected from image data, an interaction for hand writing may be initiated.

In operation 720, a path and a speed of a gesture of the hand of the user may be tracked, and a text that the user intends to input may be determined based on the path along which the hand of the user moves. Also, the text that the user intends to input may be determined using a learning based text recognizing method. Subsequently, the HCI processing unit 200 may interpret an interaction instruction corresponding to the text. For example, the text may be recognized according to a predetermined language set as a default or set by the user. Additionally, or alternatively, the HCI processing unit 200 may recognize or determine the language being used by the user by analyzing the gesture of the hand of the user and comparing the analyzed results with a database or library.

In operation 730, the interaction may be conducted based on text being input. The HCI processing unit 200 may control the display unit 300 to display a result of execution of the interaction instruction on the screen.

Although the foregoing exemplary embodiment shows a determination is made as to whether an interaction is initiated, stopped, and/or maintained based on an LOS and a direction indicated by a hand, exemplary embodiments are not limited thereby. A different gesture may be detected, and whether an interaction is initiated, stopped, and/or maintained may be determined based on the detected gesture or a combination of the gestures. The display unit may display a result of execution of the interaction instruction on the screen. For example, the display unit may display a message that the interaction instruction is being performed, may visually show the interaction instruction being performed, may communicate via audio (sound) that the interaction action is being performed, and the like.

According to exemplary embodiments, an HCI may be conducted using various gesture detection methods, and a need for an additional input device, for example, a touch screen input device, may be eliminated. Also, in the HCI recognition, ambiguity may be prevented and HCI accuracy may be improved. For example, an interaction for expanding and reducing a display item may be implemented without using a touch screen input device. Accordingly, a more satisfactory interaction experience may be provided to a user using a gesture detection approach of a computer vision technology.

The human computer interaction system and methods according to the above-described example embodiments may determine an interaction intended to be conducted by the user by detecting and recognizing a LOS of the user, and a gesture and a pose of one or more body parts (e.g., one, plural, or all body parts) of the user from the image data. For example, a desired interaction may be determined based upon the analyzed movement of one or both hands of the user, or one or more fingers on a same hand or different hands of a user. That is, an interaction may be defined as the movement of one or both hands or one or more fingers of a same hand or different hands, in one or more directions. For example, the left hand moving to the left and the right hand moving to the right may correspond to an interaction instruction to expand a display item, or two fingers on a same hand or different hands may move in opposite directions and correspond to an interaction instruction to expand a display item. For example, the left hand moving to the right and the right hand moving to the left may correspond to an interaction instruction to contract a display item, or two fingers on a same hand or different hands may move in opposite directions and correspond to an interaction instruction to contract a display item. However, the disclosure is not limited to these examples, and other operations and/or functions may be performed by detecting and recognizing gestures associated with or corresponding to the combined movements of body parts of a user. Thus, interaction instructions may be variously defined to provide a range of operations and/or functions for human computer interactions.

The human computer interaction system and methods according to the above-described example embodiments may use one or more processors. For example, a processing device may be implemented using one or more general-purpose or special purpose computers, such as, for example, a processor, an image processor, a controller and an arithmetic logic unit, a central processing unit (CPU), a graphics processing unit (GPU), a digital signal processor (DSP), a microcomputer, a field programmable array, a programmable logic unit, an application-specific integrated circuit (ASIC), a microprocessor or any other device capable of responding to and executing instructions in a defined manner.

The terms "module", and "unit," as used herein, may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Some example embodiments of the present disclosure can also be embodied as a computer readable medium including computer readable code/instruction to control at least one component of the above-described example embodiments. The medium may be any medium that can store and/or transmit the computer readable code.

The methods according to exemplary embodiments may be recorded in non-transitory computer-readable media including program instructions to implement various operations embodied by a computer. The media may also include, alone or in combination with the program instructions, data files, data structures, and the like. Examples of computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA). Some or all of the operations performed according to the above-described example embodiments may be performed over a wired or wireless network, or a combination thereof.

Although example embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A system for human computer interaction (HCI), the system comprising:
an image acquirer configured to acquire image data;
a line of sight (LOS) catcher configured to detect a first direction indicated by a LOS of a user by detecting a pitch direction and a deflection direction of a head of a user based on the image data;
a pose tracker configured to detect a second direction indicated by an appendage of the user; and
an interaction determiner configured to determine an interaction based on the first direction and the second direction maintaining a direction facing a display item,
wherein the display item is located at a point of intersection between the first direction and the second direction, and
wherein the interaction determiner:
maintains the interaction in response to determining that either the first direction or the second direction still face the direction of the display item, and
concludes the interaction in response to determining that neither the first direction nor the second direction still face the direction of the display item.

2. The system of claim 1, wherein the
pose tracker is further configured to track and recognize a pose and a gesture of a body of the user based on the image data.

3. The system of claim 2, wherein the pose tracker determines a gesture of a hand of the user by tracking and detecting a hand node of the user in the image data, and determines the pose and the gesture of the body of the user by detecting a skeleton node of the body of the user.

4. The system of claim 3, wherein the interaction determiner further determines to start the interaction based on the pose and the gesture of the body of the user.

5. The system of claim 4, wherein the interaction determiner determines whether to initiate the interaction based on the LOS of the user detected by the LOS catcher and the gesture of the hand of the user detected by the pose tracker.

6. The system of claim 2, wherein the pose tracker recognizes the gesture of the user by tracking and recognizing a gesture of a finger of the user when the user is within a predetermined distance from the image acquirer, and by tracking and recognizing a gesture of an arm of the user when the user is located beyond the predetermined distance or farther from the image acquirer.

7. The system of claim 1, further comprising:
a display configured to display on a screen a result of an implementation of the interaction,
wherein the interaction is started in response to determining that the first direction and the second direction both correspond to a direction of the display item for a period of time longer than a preset period of time.

8. The system of claim 1, further comprising:
a user-defined pose registerer configured to register an interaction instruction corresponding to a user-defined pose.

9. The system of claim 1, wherein the interaction determiner initiates implementation of the interaction and terminates the interaction, based on the LOS of the user detected by the LOS catcher.

10. A method for human computer interaction (HCI), the method comprising:
acquiring image data;
detecting a gesture of a user by tracking and recognizing a gesture of a first body part of the user in response to the user being within a predetermined distance from an image acquisition unit to acquire the image data; and
detecting the gesture of the user by tracking and recognizing a gesture of a second body part of the user in response to the user being located at or beyond the predetermined distance from the image acquisition unit;
initiating an interaction with respect to a plurality of display items when both a direction indicated by a hand and a line of sight (LOS) of the user are determined to face a direction of the plurality of display items,
wherein the method is further comprising:
initiating a predetermined interaction with respect to a display item displayed on a screen when both the LOS of the user and a direction of a hand of the user face a direction of the display item for a period of time longer than a preset period of time, and
slopping the predetermined interaction with respect to the display item when neither the LOS of the user nor the direction of the hand of the user faces the direction of the display item.

11. The method of claim 10, further comprising:
determining at least one of a start and an end of the interaction based on the detected gesture of the user.

12. The method of claim 10, further comprising:
detecting the LOS of the user from the image data by detecting a pitch direction and a deflection direction of a head of the user based on the image data; and
determining at least one of a start and an end of the interaction based on the detected LOS of the user and the detected gesture of the user.

13. The method of claim 10, further comprising:
registering an interaction instruction corresponding to a user-defined pose; and
providing information associated with reproducibility and ambiguity of the user-defined pose to the user.

14. The method of claim 10, further comprising:
displaying the plurality of display items;
selecting a first item among the plurality of display items when a gesture of a first finger is detected as indicating the first item; and
displaying a sub-menu corresponding to the first item when a gesture of a second finger is detected as indicating the first item.

15. The method of claim 10, further comprising:
displaying a three-dimensional (3D) item;
initiating an interaction with respect to the 3D item when both a direction indicated by one of the first or second body part and the LOS of the user are determined to face a direction of the 3D item; and
performing at least one of moving the 3D item, expanding a size of the 3D item, or reducing a size of the 3D item, based on the detected gesture of one of the first or second body part.

16. The method of claim 10, further comprising:
designating a preset area of a screen of a display as a hand writing area;
initiating an interaction with respect to the preset area when both a direction indicated by one of the first or second body part and the LOS of the user are determined to face a direction of the preset area;
determining a text input by the user, based on the detected gesture of one of the first or second body part; and
conducting an interaction corresponding to the determined text.

17. A method for human computer interaction, the method comprising:
- acquiring, using a camera, image data of a user positioned away from a display;
- determining a first direction of a line of sight based on the image data;
- determining a second direction indicated by at least one body part of the user;
- calculating an intersection point at which the first direction and the second direction intersect with a screen of the display;
- detecting a gesture of the user by tracking and recognizing a gesture of the at least one body part of the user; and
- determining an interaction, intended by the user to be performed, based on the calculated intersection point, detected gesture, and the second direction;
- determining that the first direction and the second direction maintain the direction facing a display item,
- wherein the interaction is initiated or stopped based on the first direction and the second direction.

* * * * *